G. M. RICHARDS.
CONTROLLING DEVICE FOR PUMPS AND THE LIKE.
APPLICATION FILED SEPT. 11, 1911.
1,096,265.
Patented May 12, 1914.
2 SHEETS—SHEET 2.
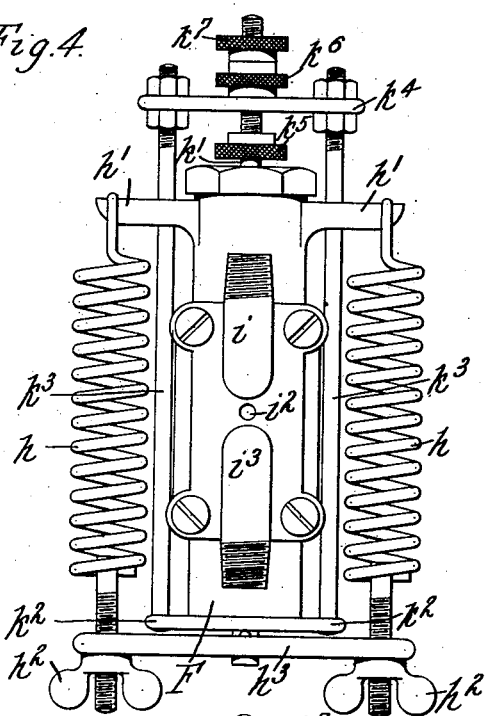
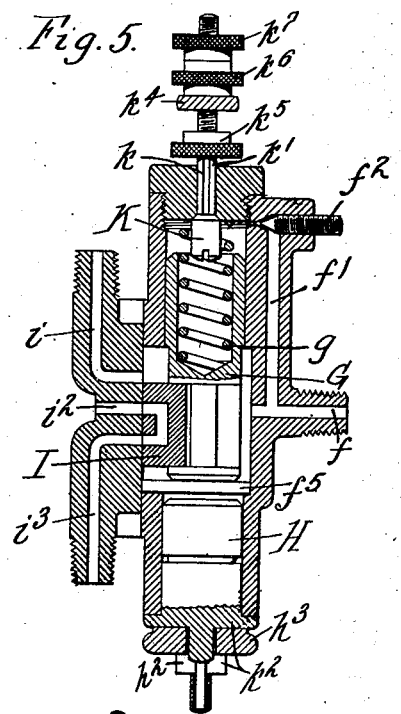
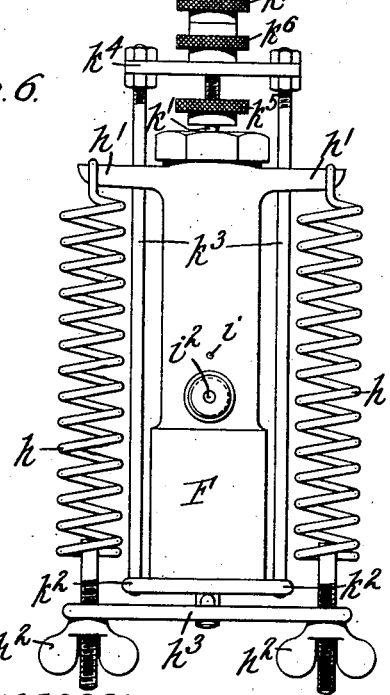
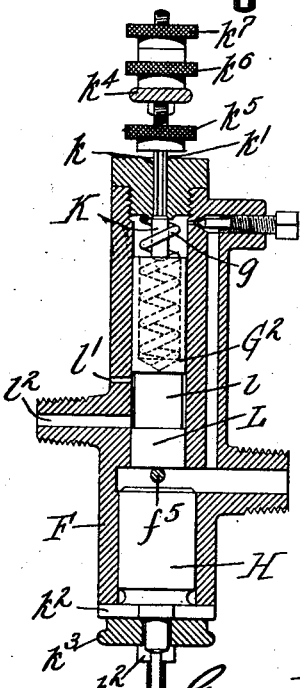

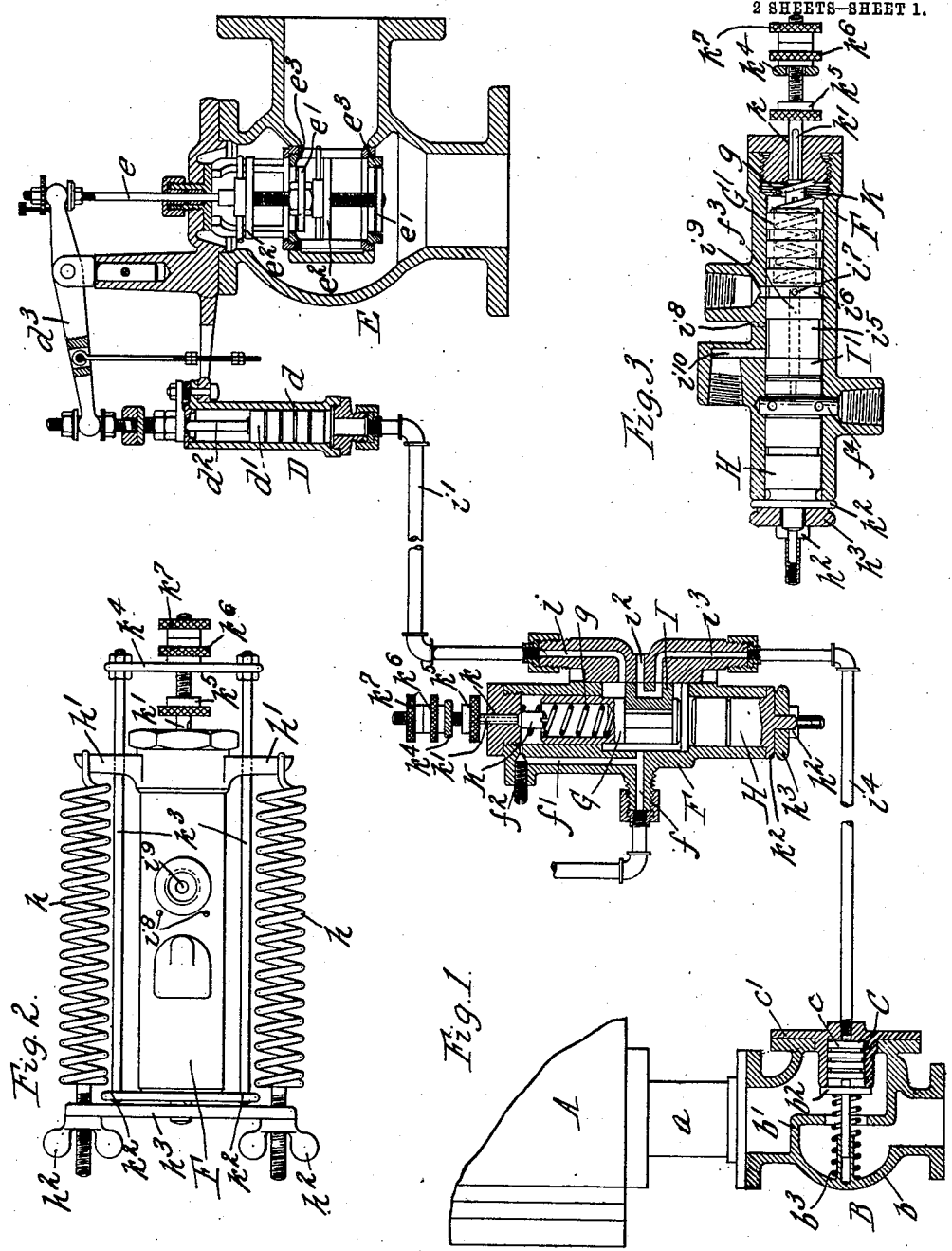

UNITED STATES PATENT OFFICE.

GEORGE M. RICHARDS, OF ERIE, PENNSYLVANIA, ASSIGNOR TO MARION A. RICHARDS, OF ERIE, PENNSYLVANIA.

CONTROLLING DEVICE FOR PUMPS AND THE LIKE.

1,096,265.

Specification of Letters Patent.  Patented May 12, 1914.

Application filed September 11, 1911. Serial No. 648,646.

*To all whom it may concern:*

Be it known that I, GEORGE M. RICHARDS, a citizen of the United States, residing at Erie, in the county of Erie and State of Pennsylvania, have invented a new and useful Improvement in Controlling Devices for Pumps and the like, of which the following is a specification.

This invention relates to controlling means of the kind used in connection with fluid compressors and pumps for automatically controlling the speed of the machine and unloading and loading the same in such a manner as to maintain the pressure of the pumped fluid within predetermined desired limits and secure the highest efficiency of the machine. Controlling devices of this kind as heretofore constructed, while being capable of unloading the machine at a predetermined pressure, require a material drop in the pressure of the pumped fluid to cause them to again load the machine which results in an objectionable variation of pressure in the receiver or discharge pipes of the machine.

The objects of this invention are to produce controlling means of this kind which will be prompt and reliable in action and which can be adjusted to effect the unloading of the machine at any desired pressure and which, if desired, can be so set that after unloading the machine they will again load it upon any predetermined slight decrease in the receiver pressure, thereby preventing objectionable variations in the pressure in the receiver or discharge pipes of the machine; and also to provide means coöperating with the unloading device for governing the operation of the compressor, so as to build up the pressure of the pumped fluid until the desired pressure thereof is obtained.

In the accompanying drawings: Figure 1 is a sectional elevation of controlling means embodying the invention. Fig. 2 is a front elevation of a slightly modified construction of the controlling device. Fig. 3 is a central sectional elevation thereof. Fig. 4 is a front elevation of the controlling device, shown in Fig. 1. Fig. 5 is a central sectional elevation thereof. Fig. 6 is a front elevation of another form of controlling device. Fig. 7 is a central sectional elevation thereof.

Like reference characters refer to like parts in the several figures.

The controlling mechanism comprises a controlling device which is acted upon by the pumped fluid and is operatively connected with a pressure governor for regulating the speed of the machine, and with an unloading device or valve which is adapted to prevent the machine from supplying any additional fluid to the receiver or service pipes, and thereby to unload the machine. The mechanism is particularly suited for use on steam driven air compressors, and for the sake of clearness, the words " steam " and " air " are used in the specification to designate respectively the motive fluid and the pumped fluid. It is not, however, intended thereby to limit the invention to steam operated air compressors.

In the particular application of this invention, as illustrated in Fig. 1, A represents a compressor cylinder and $a$ the suction or inlet pipe therefor. The suction pipe $a$ is provided with a suitable unloading valve or device B which, in the construction shown, comprises a casing $b$ with a dividing diaphragm $b'$ having an opening which is adapted to be closed by a valve or disk $b^2$. The valve $b^2$ is normally held away from its seat on the diaphragm $b'$ by a spring $b^3$ and is sealed to prevent the passage of air to the compressor cylinder by a piston $c$ working in a cylinder C which may be integrally formed on a cap or cover plate $c'$ of the valve casing. When air under pressure is admitted to the cylinder C, the piston $c$ moves the valve $b^2$ against its seat, shuts off the supply of air to the compressor, and thus unloads the machine. When the pressure in the cylinder C is released, the spring $b^3$ moves the valve off its seat and admits the air to the compressor cylinder A. The unloading valve forms no part of this invention, and any other suitable unloading device or valve, adapted to be operated by the pumped fluid, may be used if desired.

The pressure governor shown in Fig. 1 is described in detail in my application No. 536,508, filed Jan. 5, 1910. This governor is well adapted for use in connection with the controlling means, but is not necessarily used, since any suitable governor, adapted to be operated by the pumped fluid to control the speed of the machine, may be used. This governor comprises a motor D which is adapted to be actuated by the compressed air and a valve E, which is operated by the motor and is adapted to control the admission of steam to the engine. The governor motor comprises a cylinder $d$ in which a piston $d'$ is adapted to be moved by the compressed air from the receiver in opposition to resistance springs (not shown). The piston $d'$ is connected by a rod $d^2$ to one end of a lever $d^3$ which is pivoted between its ends and is connected at its opposite end to the stem $e$ of the valve E. The valve is provided with disks $e'$ $e'$ and $e^2$ $e^2$ which coöperate with seats $e^3$ $e^3$. As the pressure of the pumped fluid increases, or builds up, the pressure acting on the piston $d'$ opens the valve wider to increase the supply of steam to the compressor engine. During the opening movement of the valve the disks $e'$ $e'$ recede from the valve seats and the disks $e^2$ $e^2$ approach the seats, so as to decrease the supply of steam after a predetermined opening of the valve to cause the engine to run more slowly after a certain desired pressure of the air is reached. The disks $e^2$ $e^2$ are preferably adjustable with regard to the disks $e'$ $e'$, so that the compressor can be properly controlled to operate under different conditions, and the disks $e'$ $e'$ are so placed relative to their seats that when no pressure is acting on the governor motor D, just enough steam will pass through the valve E to keep the engine running.

Either the governor or the unloader is adapted to be connected with the supply of compressed air by a controlling device which is so constructed that when the receiver pressure is below a certain maximum, the governor will be connected to the receiver to control the operation of the machine, and when the pressure rises to the desired maximum, the governor will be disconnected from the air supply and the unloader connected therewith, so that the engine will run slowly and pump no additional air into the receiver. The controlling device comprises a cylindrical casing F in the opposite ends of which are arranged movable pistons G and H. The controlling device is shown as arranged vertically and is so described for the sake of clearness, but it can be arranged in any convenient position. Air from the receiver is admitted to the casing between the pistons G and H through an inlet passage $f$ and tends to move said pistons outwardly or away from each other and is also admitted to the cylinder above the piston G to equalize the pressure on the opposite ends of the piston through a suitable by-pass. This by-pass, in the construction shown in Figs. 1 and 5 is formed by a passage $f'$ in the casing. A regulating valve $f^2$ may be used to control the flow of air in the by-pass. In the device shown in Figs. 2 and 3, a small hole $f^3$, extending longitudinally through the piston G is provided in place of the by-pass to equalize the pressures on the two ends of the piston. When the pressure is thus equalized, the piston is adapted to be moved to its inner or lower position by a suitable spring $g$ arranged between the upper end of the casing and the piston. The piston shown is recessed to form a seat for the spring $g$. In this construction the air passes from the inlet passage to a short pipe $f^4$ which is provided with suitable holes through which the air discharges to act on the inner ends of the pistons. This tube also acts as a stop to limit the movement of the piston G', while in the controller, shown in Figs. 4-7, a stop $f^5$ is shown for this purpose.

The piston H extends out of the end of the casing and its outward movement by the pressure of the air is opposed by an adjustable resistance device, consisting, for instance, of springs $h$ $h$ connected at one end thereof to arms $h'$ on the casing F, and at their other end by tensioning screws $h^2$ to the ends of a yoke $h^3$ bearing on the outer end of the piston H. By adjusting the screws $h^2$ the tension of the springs can be varied to suit the pressure at which it is desired that the piston H should be moved by the air pressure. Any other suitable means for resisting the movement of the piston H may be employed.

The piston G actuates a controlling valve which connects either the pressure governor or the unloader with the supply of compressed air. This valve may be of any suitable construction. In the controlling device shown in Figs. 1, 4 and 5 a slide valve I is shown which straddles a reduced portion of the piston G, and when the piston G is in the lower position shown it uncovers a passage $i$ which is connected by a pipe $i'$ with the motor cylinder of the pressure governor, and joins an exhaust passage $i^2$ with a passage $i^3$ connected by a pipe $i^4$ with the cylinder of the unloading device. The compressed air will then pass from the receiver through the controller casing F to the pressure governor and operate the same to control the compressor, as before explained. When the piston G is moved to its upper position the valve I connects the governor motor with the exhaust passage $i^2$, thus placing the governor out of action, and uncovers the passage $i^3$ leading to the unloading device whereby air from the receiver is admitted to the unloading device and operates it to unload the compressor.

Figs. 2 and 3 illustrate a different controlling valve I' which is formed integral with the lower portion of the piston G'. The valve is provided with two circumferential grooves $i^5$ $i^6$, of which the latter communicates through a transverse hole $i^7$ with the central hole $f^3$ of the piston. The casing F is provided with vent holes $i^8$ and with passages or holes $i^9$ and $i^{10}$ which connect with the pipes leading to the governor and to the unloader, respectively. When the piston G' is in the lower position, as shown in the drawings, compressed air is admitted from the lower side of the piston G' through the holes $f^3$ and $i^7$ and the groove $i^6$ to the passage $i^9$ and thence to the governor motor. The passage $i^{10}$ is connected through the groove $i^5$ to the vent hole $i^8$. When the valve is moved to its upper position, the passage $i^{10}$ is uncovered and air is admitted through it to the unloader from the casing F, and the upper passage $i^9$ is connected to the vent hole $i^8$ so that the governor motor is connected to the atmosphere rendering the governor inoperative while the unloader is connected with the supply of compressed air and shuts off the supply of air to the compressor. K represents a relief valve which controls a hole $k$ in the upper end of the casing F through which the pressure above the piston G can be relieved when the valve is opened to permit the upward movement of the piston and controlling valve I. The relief valve, shown, is provided with a stem $k'$ which projects through the relief hole and is grooved, or otherwise shaped, to allow the escape of the air through the hole. This valve is operated by the lower piston H through suitable connections. For instance, in the constructions shown, the piston is provided at its outer end with lateral arms $k^2$ which are connected by rods $k^3$ extending alongside of the casing F with a yoke $k^4$ above the casing. The outer end of the stem of the relief valve, which is screw-threaded, passes through a hole in the yoke and is provided above and below the yoke with adjustable nuts $k^5$ $k^6$ adapted to be engaged by the yoke for opening and closing the valve. $k^7$ is a lock nut for the adjustable nut $k^6$. A lost motion connection is thus provided between the piston H and the relief valve which allows the piston to be moved, more or less, depending upon the adjustment of the nuts $k^5$ $k^6$ before operating the relief valve. Any other suitable lost motion connection between the piston H and the relief valve could be used. When the relief valve is seated, as shown in the drawings, the air cannot escape from the upper end of the casing F, and the pressure then being equal on opposite ends of the piston G, the latter will be held in the lower position, shown, by its spring. The relief opening $k$ is of such size that when the valve K is unseated, air will escape from the upper end of the casing faster than it can enter through the by-pass opening. The pressure acting on the upper face of the piston G will consequently be diminished, and the pressure acting on the lower face of the piston will move the piston and the controlling valve I against the action of the spring $g$ into the upper position. When the relief valve is again seated, the escape of air from the upper part of the casing is prevented and the pressure on opposite ends of the piston being equalized by the air admitted through the by-pass, the spring $g$ will return the piston and controlling valve I to the lower position shown. If the piston H is forced outwardly, due to the increased pressure of the air in the receiver, the yoke $k^4$, connected with the piston will be moved downwardly, striking the lower nut $k^5$ and unseating the valve. When the pressure is reduced and permits the upward movement of the piston H, the yoke will strike the upper nut $k^6$ and again seat the valve. By adjusting the nuts $k^5$ and $k^6$ relatively to the yoke $k^4$, the controlling device can be so adjusted that the relief valve K and consequently the piston G will be actuated upon either greater or less variations in the receiver pressure. By placing both nuts close to the yoke $k^4$, the device can be adjusted so that the piston G will be actuated by slight variations in the receiver pressure, the advantages of which will be hereinafter explained.

The operation of the device is as follows: Compressed air from a receiver or other container in which a constant pressure is to be maintained enters the casing F through the passage $f$, and by means of the by-pass, an equal pressure is established on opposite ends of the piston G which is held in its lower position by the spring $g$. As long as the pressure does not exceed the desired maximum, the piston G and the controlling valve I, connected therewith, remain in their lower positions in which the governor is connected with the supply of compressed air, while the unloader in inoperative. When the pressure exceeds the desired maximum, the piston H unseats the relief valve K discharging the compressed air from the upper portion of the casing F, whereupon the piston G and the controlling valve I, connected therewith, are moved into their upper positions by the air acting on the lower face of the piston G and the valve permits the compressed air to actuate the unloader which cuts off the supply of air to the compressor and disconnects the governor from the supply of compressed air, discharging the air in the governor cylinder through the vent holes so that the valve disks $e'$ $e'$, which control the supply of steam to the engine, will be adjacent to their seats and permit just enough steam to pass through the governor to keep the engine running.

The described controlling device has the advantage that it can be so set that it will respond to slight fluctuations in pressure in the receiver or discharge pipes of the compressor to load or unload the same, and thereby keep the pressure in the receiver very nearly constant. The variation in pressure in the receiver can be controlled by adjusting the nuts $k^5$ $k^6$ and by adjusting the tension of the springs $h$ $h$ the device can be adapted to operate at a variety of pressures. The device is so constructed that it can be easily adjusted and is positive and reliable in its action.

The controlling device shown in Figs. 6 and 7 is adapted to operate only upon the unloader, and has no operative connection with the governor. The construction of this device is similar to those already described, with the exception of the valve L, which is of the piston type, formed integral with the piston $G^2$, and is provided with only one circumferential groove $l$ which is adapted to connect a vent hole $l'$ and a passage $l^2$ formed in the unloader casing. The passage $l^2$ leads to the cylinder of the unloader when in its lower position. When this valve is in its upper or raised position, the passage $l^2$ is uncovered, permitting air to pass to the unloader from the casing F.

I claim as my invention:

1. The combination with a pump, of a governor which is actuated by the pumped fluid and normally governs the speed of the pump in accordance with variations in the pressure of the pumped fluid until a predetermined pressure is attained, an unloading device which is adapted to be actuated by the pumped fluid to relieve the load on the pump, and a controlling device which is actuated by the pumped fluid to deliver the pumped fluid either to said governor or to said unloading device for actuating the same, whereby only one of these parts is in operation at one time, substantially as set forth.

2. The combination with a pump driven by means operated by motive fluid, of a governor actuated by the pumped fluid for automatically regulating the supply of motive fluid to said driving means for increasing the supply of motive fluid as the pressure of the pumped fluid increases, and then decreasing the supply of motive fluid after the pumped fluid attains a predetermined pressure, an unloading device which is adapted to be actuated by the pumped fluid to relieve the load on the pump, and a controlling device which is actuated by the pumped fluid to either connect said governor with the supply of pumped fluid and disconnect said unloading device therefrom, on to disconnect said governor from the supply of pumped fluid and to connect said unloading device therewith, substantially as set forth.

3. The combination with a pump, of a governor which controls the operation of said pump, an unloading device which is adapted to relieve the load on the pump, and a controlling device which is actuated by the pressure of the pumped fluid and which is operatively connected with said governor and said unloading device to cause said governor to be actuated to control the engine until the pumped fluid attains a certain predetermined pressure, and to render said governor inoperative and to actuate said unloading device when the pumped fluid attains a greater pressure than said predetermined pressure, substantially as set forth.

4. The combination with a pump, of a governor actuated by the pumped fluid which normally governs the speed of the pump in accordance with variations in the pressure of the pumped fluid, an unloading device which is adapted to be actuated by the pumped fluid to relieve the load on the pump, and a controlling device which is operatively connected with said governor and with said unloading device and which is actuated by the pressure of the pumped fluid to connect either said governor or said unloading device with the supply of pumped fluid, said controlling device connecting said governor with the supply of pumped fluid until the pumped fluid attains a certain predetermined pressure, and then disconnecting said governor from said supply of pumped fluid and connecting said unloading device therewith, substantially as set forth.

5. The combination with a pump driven by means operated by motive fluid, of a governor which is actuated by the pumped fluid for regulating the supply of motive fluid to the driving means of the pump and which permits only a limited quantity of motive fluid to pass to said driving means when said governor is disconnected from the supply of pumped fluid, an unloading device which is adapted to be actuated by the pumped fluid to relieve the load on the pump, and a controlling device which is actuated by the pumped fluid to either connect said governor with the supply of pumped fluid and disconnect said unloading device therefrom, or to disconnect said governor from the supply of pumped fluid and to connect said unloading device therewith, whereby the pump will be operated at a slow speed when said unloader alone is in operation, substantially as set forth.

6. In a controlling device of the character described, the combination of a cylinder, means for supplying fluid under pressure to said cylinder, two pistons movable in said cylinder and acted upon by the same fluid, a controlling valve actuated by one of said pistons, means for admitting fluid pressure to said cylinder at opposite ends of said piston, a relief device actuated by said second piston for relieving the pressure in said cylinder at one end of said first mentioned piston to permit movement of said piston, and means for resisting the movement of said second piston by said fluid pressure, substantially as set forth.

7. In a controlling device of the character described, the combination of a cylinder, means for supplying fluid under pressure to said cylinder, two pistons movable in said cylinder and acted upon by the same fluid, a controlling valve actuated by one of said pistons, means for admitting fluid pressure to said cylinder at opposite ends of said piston, a relief device actuated by said second piston for relieving the pressure in said cylinder at one end of said first mentioned piston to permit movement of said piston, means for resisting the movement of said second piston by said fluid pressure, and a lost motion connection between said second piston and said relief device whereby the relief device is adapted to be actuated after an initial movement of said second piston, substantially as set forth.

8. In a controlling device of the character described, the combination of a cylinder, means for supplying fluid under pressure to said cylinder, two pistons movable in said cylinder and acted upon by the same fluid, a controlling valve actuated by one of said pistons, means for admitting fluid pressure to said cylinder at opposite ends of said piston, a relief device actuated by said second piston for relieving the pressure in said cylinder at one end of said first mentioned piston to permit movement of said piston, means for resisting the movement of said second piston by said fluid pressure, and an adjustable lost motion connection between said second piston and said relief device whereby the relief device is adapted to be actuated after a predetermined initial movement of said second piston, substantially as set forth.

9. In a controlling device of the character described, the combination of a cylinder to which pumped fluid is admitted, two pistons movable in said cylinder and acted upon by the same fluid, both ends of one of said pistons being acted upon by the pressure of the pumped fluid, means for discharging the pumped fluid from the cylinder at one end of said piston, and operative connections between the second piston and said discharging means whereby the discharging means are adapted to be actuated by said second piston, substantially as set forth.

10. In a controlling device of the character described, the combination of a cylinder, two pistons arranged one in advance of the other in said cylinder, means for admitting fluid pressure to said cylinder between the adjacent inner ends of said pistons for moving said pistons in opposite directions and for admitting fluid pressure to the cylinder at the outer end of one of said pistons to prevent outward movement of said piston, a controlling valve actuated by said piston, a relief valve for relieving the pressure in the cylinder at said outer end of said piston to permit the outward movement of said piston, means for resisting the outward movement of said other piston, and means operated by said last mentioned piston for actuating said relief valve after an initial movement of the piston, substantially as set forth.

11. In a controlling device of the character described, the combination of a cylinder, two pistons arranged one in advance of the other in said cylinder, means for admitting fluid pressure to said cylinder between the adjacent inner ends of said pistons for moving said pistons in opposite directions and for admitting fluid pressure to the cylinder at the outer end of one of said pistons to prevent outward movement of said piston, a controlling valve actuated by said piston, a relief valve for relieving the pressure in the cylinder at said outer end of said piston to permit the outward movement of said piston, adjustable resistance means which oppose the outward movement of said other piston, means whereby said last mentioned piston actuates said relief valve after an initial movement of the piston, and means for regulating the initial independent movement of said piston, substantially as set forth.

12. In a controlling device of the character described, the combination of a cylinder, a piston movable longitudinally within said cylinder in one end thereof, a second piston movable longitudinally in the other end of said cylinder, a controlling valve located within said cylinder and between said two pistons and which is movable with said first mentioned piston, the pumped fluid being admitted to the cylinder intermediate of said two pistons and acting on the adjacent ends thereof, a passage for admitting the pumped fluid to the end of the cylinder to act on the other face of said first mentioned piston, a relief valve for discharging the pumped fluid from said end of the cylinder, and means connected with said second piston for actuating said relief valve, substantially as set forth.

13. In a controlling device of the character described, the combination of a cylinder having one end closed and an inlet for the pumped fluid, a piston movable and contained in said cylinder at one side of said inlet, a controlling valve actuated by said piston, a passage in the cylinder for conducting the pumped fluid to the closed end of the cylinder at the other side of said piston, adjustable means for controlling the flow of fluid to the closed end of the cylinder, a relief valve for discharging the fluid from the closed end of the cylinder, and a second piston movable in the cylinder at the opposite side of said inlet from said first mentioned piston and being adapted to actuate said relief valve, substantially as set forth.

Witness my hand, this 8th day of September, 1911.

GEORGE M. RICHARDS.

Witnesses:
FLOYD HILL,
GEO. K. FRANK.